United States Patent [19]

Henkel et al.

[11] 4,100,592
[45] Jul. 11, 1978

[54] PROJECTION LIGHTING ASSEMBLY AND LAMP UNIT FOR USE THEREIN

[75] Inventors: Charles E. Henkel, Winchester; C. Daniel Holmes, Lexington, both of Ky.

[73] Assignee: GTE Sylvania Incorporated, Stamford, Conn.

[21] Appl. No.: 753,339

[22] Filed: Dec. 22, 1976

[51] Int. Cl.² .......................................... H04M 1/22
[52] U.S. Cl. .................................. 362/191; 362/198; 362/288; 362/306; 362/368
[58] Field of Search ............... 240/20, 41 B, 41 L, 240/41 NM, 52.1, 52.5; 362/191, 198, 288, 306, 368, 374

[56] References Cited

U.S. PATENT DOCUMENTS

| 2,110,134 | 3/1938 | Douglas | 240/41 BM X |
|---|---|---|---|
| 2,117,762 | 5/1938 | Douglas | 240/41 BM X |
| 3,069,539 | 12/1962 | Kidd | 240/52.5 X |
| 3,176,260 | 3/1965 | Pascucci | 240/52.1 X |
| 3,639,745 | 2/1972 | Shiki | 240/52.1 X |
| 4,023,893 | 5/1977 | Hebert et al. | 240/41 BM X |

FOREIGN PATENT DOCUMENTS 1,380,083  4/1971  United Kingdom ............... 240/41 L

*Primary Examiner*—Peter A. Nelson
*Attorney, Agent, or Firm*—Lawrence R. Fraley

[57] ABSTRACT

A lamp unit for use within a socket which defines an opening having a pair of upstanding walls. The unit is especially adapted for use in projection applications, e.g. movie, slide, and microfilm projectors, and comprises a base which is positioned within the socket's opening, a reflector and electric lamp securely positioned within the base in a coaxial relationship, and biasing means in the form of an elongated rib, two spaced protuberances, or a resilient spring, etc. located on one side of the base. Accordingly, the base is biased against one of the upstanding walls of the opening to provide an interference fit between base and socket and maintain consistent alignment of these components. A lighting assembly utilizing the above lamp unit is also disclosed.

19 Claims, 6 Drawing Figures

PROJECTION LIGHTING ASSEMBLY AND LAMP UNIT FOR USE THEREIN

BACKGROUND OF THE INVENTION

The invention relates to electric lamp units and lighting assemblies and particularly to such units and assemblies adapted for use in projection applications, e.g. motion pictures, slide film, and microfilm projectors.

Even more particularly, this invention relates to means for assuring precision alignment of these units and assmeblies within such projectors.

One of the critical factors affecting the efficient operation of motion picture, slide, microfilm, and similar projectors is the alignment of the projection lamps used therein. Most projection assemblies utilize at least one lamp unit, the function of which is to concentrate the majority of light output from the unit's electric lamp toward a film "gate" or similar opening within the projector and thereafter onto the respective film. Projection lamp units also normally include a reflector which is coaxially-oriented with the lamp's filament to facilitate the aforementioned light concentration. Errors in alignment of the lamp assembly usually result in insufficient illumination of the film, lack of uniform illumination, as well as focusing problems due to the mismatch between the concentrated light and lens system typically employed in most projectors.

Most of the above alignment errors occur as a result of vibration and other external forces which tend to displace the lamp unit. Repeated replacement of the lamp unit may also adversely affect alignment.

It is therefore believed that an electric lamp unit and assembly particularly adapted for use within projection applications and capable of maintaining consistent alignment between the unit or assembly and the projector's film gate, lens system, etc. would constitute an advancement in the art.

OBJECTS AND SUMMARY OF THE INVENTION

It is a primary objective of the present invention to enhance the electric lamp art and particularly the lamp art associated with most projection applications.

It is a further object to provide a projection lamp and lighting assembly which assures precise and consistent alignment of the assembly within the projector.

It is an even further object of the invention to maintain consistent alignment during repeated replacement of these assemblies as well as during adverse environmental conditions such as vibration.

According to one aspect of the invention, there is provided a lamp unit which is usable within a socket having a pair of spaced upstanding walls. The unit includes a base, a reflector and electric lamp coaxially-oriented and securedly positioned within the base, and a biasing means located on the base for biasing the base against one of the socket's upstanding walls.

In accordance with another aspect of the invention, a lighting assembly is provided which includes a socket, base, coaxially-oriented electric lamp and reflector secured to the base, and biasing means on one side of the base for biasing the base against one of the upstanding walls which define an opening within the socket.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
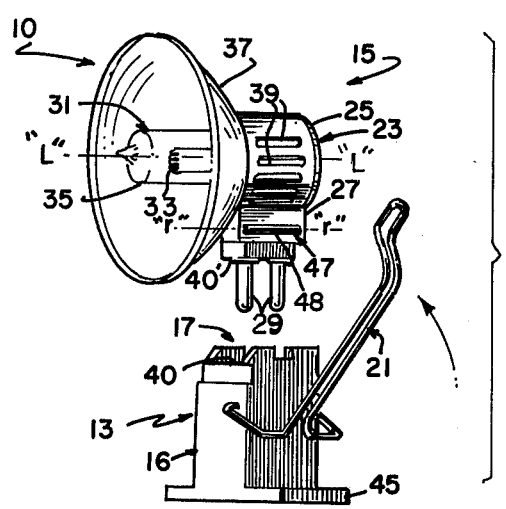
FIG. 1 is a perspective view of a lighting assembly in accordance with a preferred embodiment of the invention.
Figure 2:
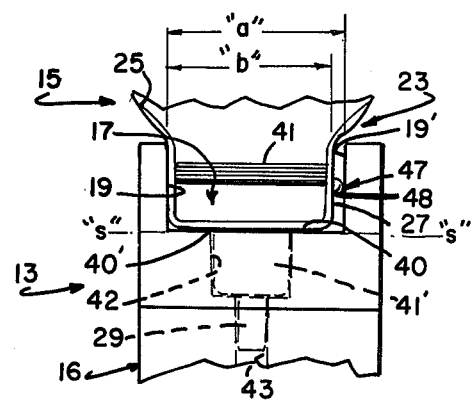
FIG. 2 is a front view of the assembly of FIG. 1 showing the positioning relationship between the assembly's lamp unit and socket components.

In FIG. 1 there is illustrated a lighting assembly 10 in accordance with a preferred embodiment of the invention. Assembly 10 comprises a socket 13 and a lamp unit 15 for use within the socket, and is especially adapted for use within a motion picture, slide, or microfilm projector (not shown). Socket 13 comprises a housing 16 which defines therein an opening or elongated channel 17 having a pair of spaced upstanding walls 19 and 19' (FIG. 2). Preferably, walls 19 and 19' are parallel and substantially flat. Assembly 10 may also include a clamping member 21 which is pivotally oriented on housing 16 and adapted for engaging lamp unit 15 when the unit is located in opening 17. Member 21 thus serves to positively clamp unit 15 to socket 13. It will be understood with regard to the present invention however, that alignment of the lamp unit within socket 13 is capable of being maintained without utilization of a clamping device such as shown.

With further regard to the invention, it is understood that socket 13 is usually securedly affixed or mounted within the associated projector assembly. Accordingly, opening 17 serves to align lamp unit 15 with the projector's film gate, lens system, etc. It can therefore be understood that alignment between the lamp unit 15 and socket 13 is critical to precision operation of the projector.

Lamp unit 15 comprises a base member 23 which includes a receptacle portion 25 and a boxlike seating portion 27 for being positioned within opening 17 in socket 13. Pins 29 protrude from seating portion 27 and are internally connected to the unit's electric lamp 31. Lamp 31 is preferably an incandescent lamp and even more preferably an incandescent lamp of the tungsten-halogen variety. Such lamps typically include a tungsten filament 33 located within the lamp's quartz envelope 35.

Envelope 35 is filled with an inert gas, such as argon, nitrogen, krypton, or a mixture thereof, and a halogen additive such as iodine or bromine, for example, in the form of hydrogen bromide. The total pressure of the admixed halogen and fill gas may range from 2 to 7 atmospheres at room temperature, depending upon the fill gas composition and the voltage, lumen and life ratings for which the lamp is designed. In such a lamp, the tungsten, which is normally evaporated from the filament during operations, combines with the halogen to form a gaseous halide and is thus kept from depositing on the wall of the lamp envelope. The halide normally has a regenerating action, being used over and over again, because as it returns to the hot filament or lead-in wires, the halide will decompose, depositing the tungsten on the filament or lead-in wire. This halogen cycle is well known, and lamps utilizing it have been on the market.

An ellipsoidal reflector 37 is centrally attached to and securely positioned within receptacle portion 25 by means of, for example, a high temperature adhesive. Reflector 37 is conveniently made of glass and includes a metallic reflective coating thereon. The coating is preferably dichroic to reflect light radiation falling on its surface but still permit a substantial amount of the heat radiation to pass therethrough. Accordingly, reflector 37 advantageously minimizes the heat directed toward the film being projected. To further enhance heat removal, it is preferred that receptacle portion 25 be provided with a plurality of vents or slots 39.

It is desired in the present invention that opening 17 be further defined by a substantially flat surface 40 and that boxlike portion 27 includes a lower flat surface 40' which rests flush upon surface 40 when lamp 15 and socket 13 are joined. In the position, both surfaces occupy a common plane "s—s" (FIG. 2). It is further desired that parallel walls 19 and 19' be substantially perpendicular to surface 40. Accordingly, both of the sides of boxlike portion 27 which eventually face walls 19 and 19' when portion 27 is located in opening 17 are parallel and also perpendicular to surface 40'.

In FIG. 2, the lamp and reflector components of assembly 10 have been removed for clarification purposes. Base 23 is shown as including the aforedescribed receptacle and boxlike seating portions 25 and 27, respectively. Preferably located within seating portion 27 is an electrically insulative common member 41 in which are securely positioned the spacedly-oriented conductive pins 29. Member 41 is snugly positioned within seating portion 27 and preferably held in place by crimping. Member 41 includes a projecting portion 41' which projects through seating portion 27 and is located within accommodating slot 42 located in housing 16. Apertures 43 are also provided within housing 16 to accommodate pins 29. Located within apertures 43 are a pair of elongated female contacting members (not shown) which electrically engage pins 29 at one end and are adapted for being inserted into an appropriate socket or similar components within the respective projector. Added securement can be attained utilizing retaining screws which fit through holes (not shown) suitably provided within the flanged portion 45 of housing 16.

It has been determined that in order to assure and maintain consistent, positive alignment between lamp unit 15 and socket 13, it is necessary to provide an interference fit between these components and their connecting location. By interference is meant a fit whereby the external width of the component being positioned within opening 17 exceeds the internal width (dimension "$a$") of the opening by a minimum of about .001 inch. Typical values for the width (dimension "$b$") of seating portion 27 are within the range of about 0.560 to 0.564 inch. Accordingly, typical values for dimension "$a$" are within the range of about 0.564 to about 0.568 inch. It can be seen from these dimensional ranges that the differential between "$a$" and "$b$" may range anywhere from 0 to 0.008 inch.

Accordingly, a primary feature of the present invention is to locate on one side of the boxlike seating portion 27 a biasing means 47 which positively engages one of the upstanding walls of opening 17 to bias seating portion 27 against the oppposing wall. Biasing means 47 extends from the side a sufficient distance to assure the aforementioned minimum excess (interference) dimension of about 0.001 inch. A typical height for biasing means 47 is about 0.072 inch with a tolerance dimension of ±.005 inch. It is understood that the aforementioned excess dimension must be maintained using the above dimensional ranges in order to assure the required interference fit. That is, the combined width for seating portion 27 and biasing means 47 must exceed the internal width of opening 17 by the defined dimensional value. In the present invention, the preferred interference fit requires the combined width of portion 27 and means 47 to exceed the internal width of opening 17 by about 0.003 inch.

In accordance with one embodiment of the invention, biasing means 47 comprises a singular elongated rib 48 which forms an integral part of seating portion 27 and protrudes therefrom substantially along the entire length of the portion. Rib 48 lies along an axis "$r$—$r$" which is preferably substantially parallel to the axis occupied by lamp 31 (shown as "L—L" in FIG. 1). Rib 48 is also parallel to the lower surface 40'.

Figure 3:
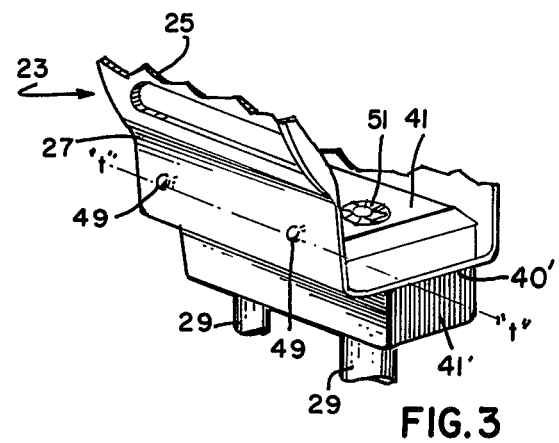
FIGS. 3–6 represent alternative embodiments for the biasing means of the invention.

As an alternate embodiment, means 47 is shown in FIG. 3 as comprising at least two protruding tip members 49 each projecting from the side of portion 27 a distance substantially the same as rib 48 in FIG. 2. Tips 49 both lie along a common axis "$t$—$t$" which is parallel to axis "L—L" of lamp 31. Axis "$t$—$t$" is also parallel to lower surface 40'. In FIG. 3 is shown common insulative member 41 and the flanged end 51 of one of the pins 29 located therein. Vented receptacle portion 25 is also partially shown.

Figure 4:
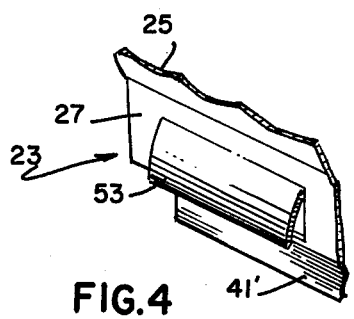
Figure 5:
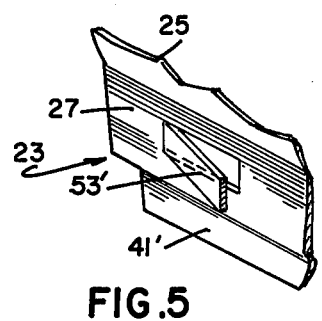
Figure 6:
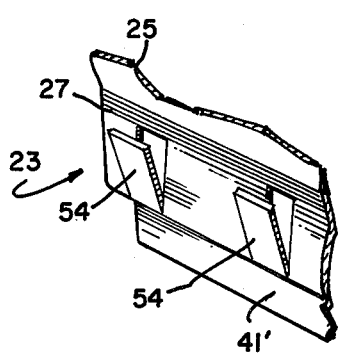

FIGS. 4–6 illustrate various resilient biasing means adapted for use with the present invention. In FIGS. 4 and 5, singular elongated springs 53 and 53', respectively, are shown as being located on portion 27 and projecting therefrom in varying directions. In FIG. 6 is shown a pair of spacedly oriented elongated springs 54. Projecting portion 41' of common insulator 41 is also illustrated in FIGS. 3–6.

The preferred material for base 23 is aluminum having a thickness of about 0.024 inch. The preferred insulative material for housing 16 and common insulator 41 is plastic, e.g. a phenolic. Pins 29 are metallic, e.g., nickel plated brass.

There has been shown and described a lamp unit and lighting assembly wherein the boxlike seating portion of the unit includes on one side thereof a biasing means to assure an interference fit between the unit's seating portion and a respective socket. Consistent alignment of the lamp and socket is thus maintained despite such potentially adverse environmental conditions as vibration. Interchangeability of the lamp units is also facilitated. As has been described, the preferred embodiments of the invention provide a means whereby the axis ("L—L") occupied by the assembly's lamp (31) is maintained substantially parallel to the flat surface (40) of the assembly's socket. Additionally, secured positioning of the lamp unit within the socket results in the lamp unit's base resting flush on the above surface 40.

While there have been shown and described what are at present considered the preferred embodiments of the invention it will be obvious to those skilled in the art that various changes and modifications may be made therein without departing from the scope of the invention as defined by the appended claims.

What is claimed is:

1. A projection lamp unit for use within an electrically insulative socket defining an opening therein having first and second spacedly positioned and parallel upstanding flat walls, said projection lamp unit comprising:
   a base member including a receptacle portion, and a boxlike seating portion for being positioned within said opening within said socket;
   a reflector securedly positioned within said receptacle portion of said base member;
   a projection lamp securedly positioned within said receptacle portion of said base member in a substantially coaxial relationship with said reflector; and
   biasing means located only on one side of said boxlike seating portion of said base member for positively engaging said first upstanding flat wall of said opening to bias said seating portion against said second upstanding flat wall and provide an interference fit between said seating portion and said upstanding flat walls of said socket.

2. The lamp unit according to claim 1 wherein said biasing means comprises an elongated rib positioned substantially along the entire length of said side of said boxlike seating portion.

3. The lamp unit according to claim 1 wherein said biasing means comprises at least two spacedly-positioned protruding tip members.

4. The lamp unit according to claim 1 wherein said biasing means is resilient.

5. The lamp unit according to claim 4 wherein said biasing means comprises at least one elongated spring member.

6. The lamp unit according to claim 5 wherein the number of said elongated spring members is two, said spring members spacedly positioned from each other on said boxlike seating portion.

7. The lamp unit according to claim 1 wherein said boxlike seating portion comprises a metallic material and said socket comprises a plastic material, said biasing means forming an integral part of said seating portion.

8. The lamp unit according to claim 1 wherein said boxlike seating portion includes a lower flat surface which is adapted for resting flush on a flat surface of said socket and occupying a common plane therewith, said common plane parallel to the axis of said projection lamp.

9. A projection lighting assembly comprising:
   an electrically insulative socket defining an opening therein having first and second spacedly positioned and parallel upstanding flat walls; and
   a projection lamp unit comprising a base member including a receptacle portion, and a boxlike seating portion for being positioned within said opening within said socket, a reflector securedly positioned within said receptacle portion of said base member, a projection lamp securedly positioned within said receptacle portion of said base member in a substantially coaxial relationship with said reflector, and biasing means located only on one side of said boxlike seating portion of said base member for positively engaging said first upstanding flat wall of said opening to bias said seating portion against said second upstanding flat wall and provide an interference fit between said seating portion and said upstanding flat walls of said socket.

10. The lighting assembly according to claim 9 wherein said biasing means comprises an elongated rib positioned substantially along the entire length of said side of said boxlike seating portion.

11. The lighting assembly according to claim 9 wherein said biasing means comprises at least two spacedly-positioned protruding tip members.

12. The lighting assembly according to claim 9 wherein said biasing means is resilient.

13. The lighting assembly according to claim 12 wherein said biasing means comprises at least one elongated spring member.

14. The lighting assembly according to claim 13 wherein the number of said elongated spring members is two, said spring members spacedly positioned from each other on said boxlike seating portion.

15. The lighting assembly according to claim 9 wherein said boxlike seating portion comprises a metallic material and said socket comprises a plastic material, said biasing means forming an integral part of said seating portion.

16. The lighting assembly according to claim 9 further including a clamping member pivotally oriented on said socket for engaging said base to positively clamp said base to said socket.

17. The lighting assembly according to claim 9 wherein said boxlike seating portion and said socket each include a flat surface, said flat surface of said boxlike seating portion resting flush on said flat surface of said socket and occupying a common plane therewith, said common plane parallel to the axis of said projection lamp.

18. The lamp unit according to claim 8 wherein said biasing means occupies an axis parallel to said axis of said projection lamp.

19. The lighting assembly according to claim 17 wherein said biasing means occupies an axis parallel to said axis of said projection lamp.

* * * * *